H. AND L. NILSON.
TRANSMISSION CASING FOR TRACTION MACHINES.
APPLICATION FILED FEB. 3, 1919.
1,415,606.
Patented May 9, 1922.
3 SHEETS—SHEET 3.
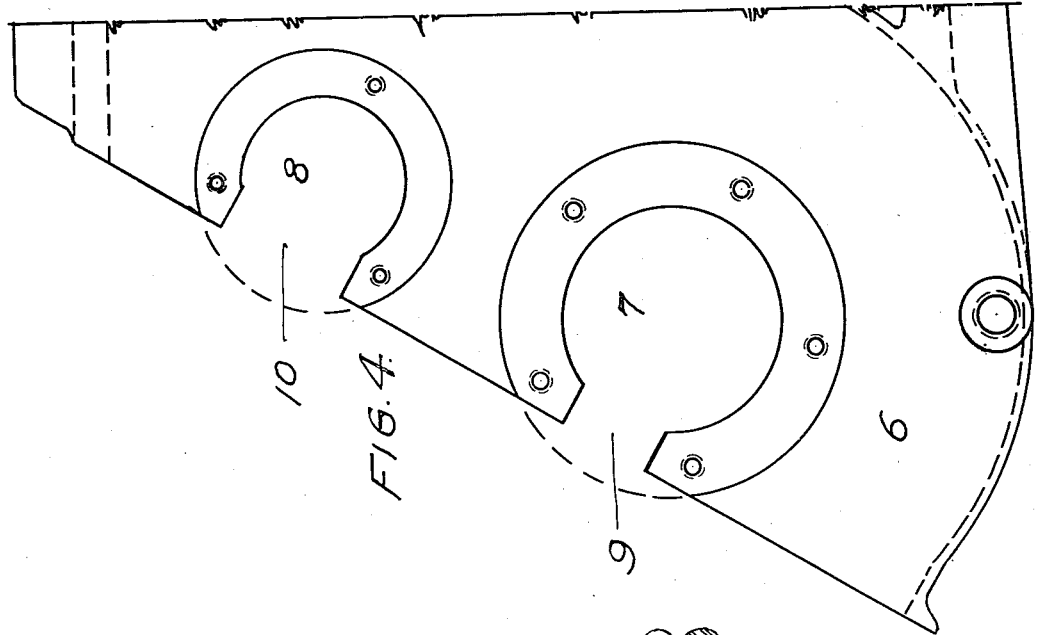
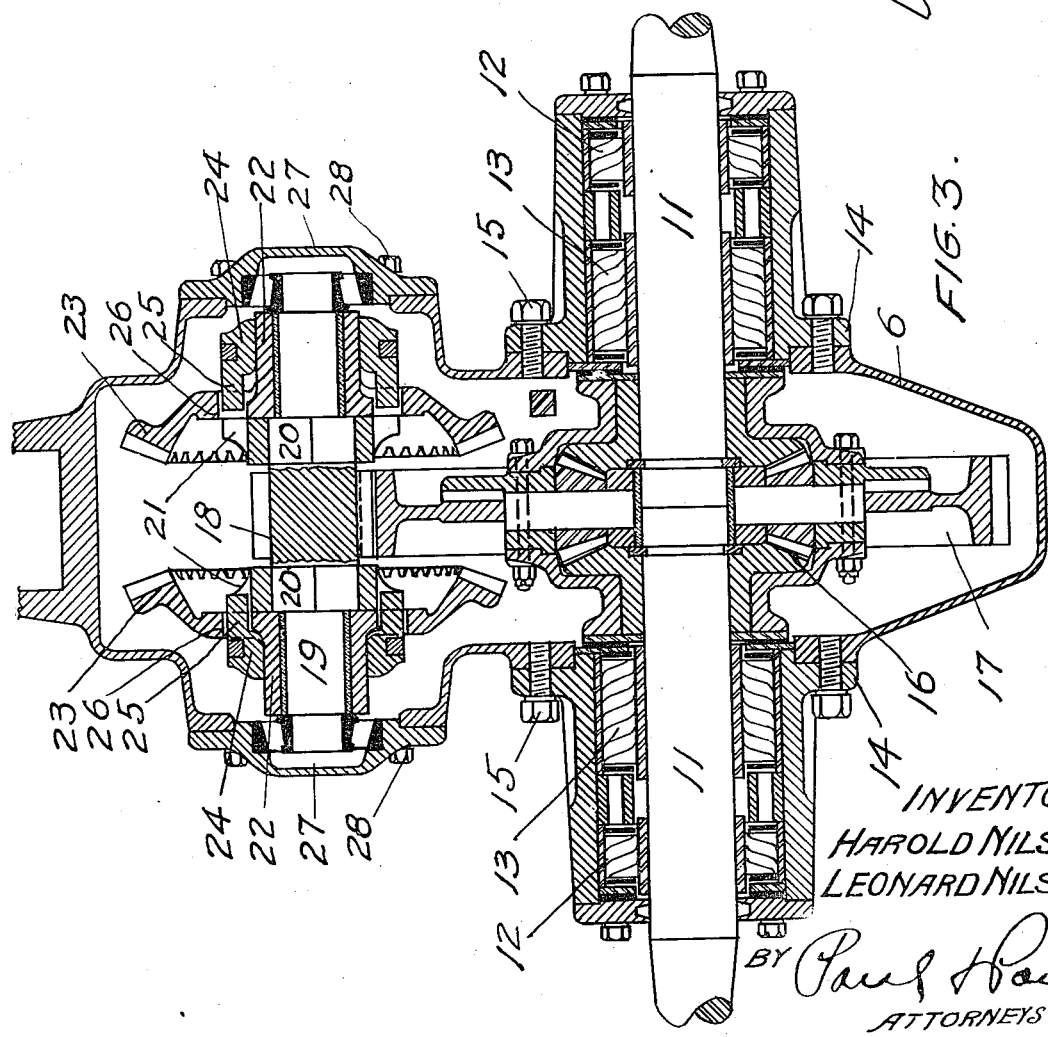
INVENTORS
HAROLD NILSON.
LEONARD NILSON
BY Paul Howe
ATTORNEYS

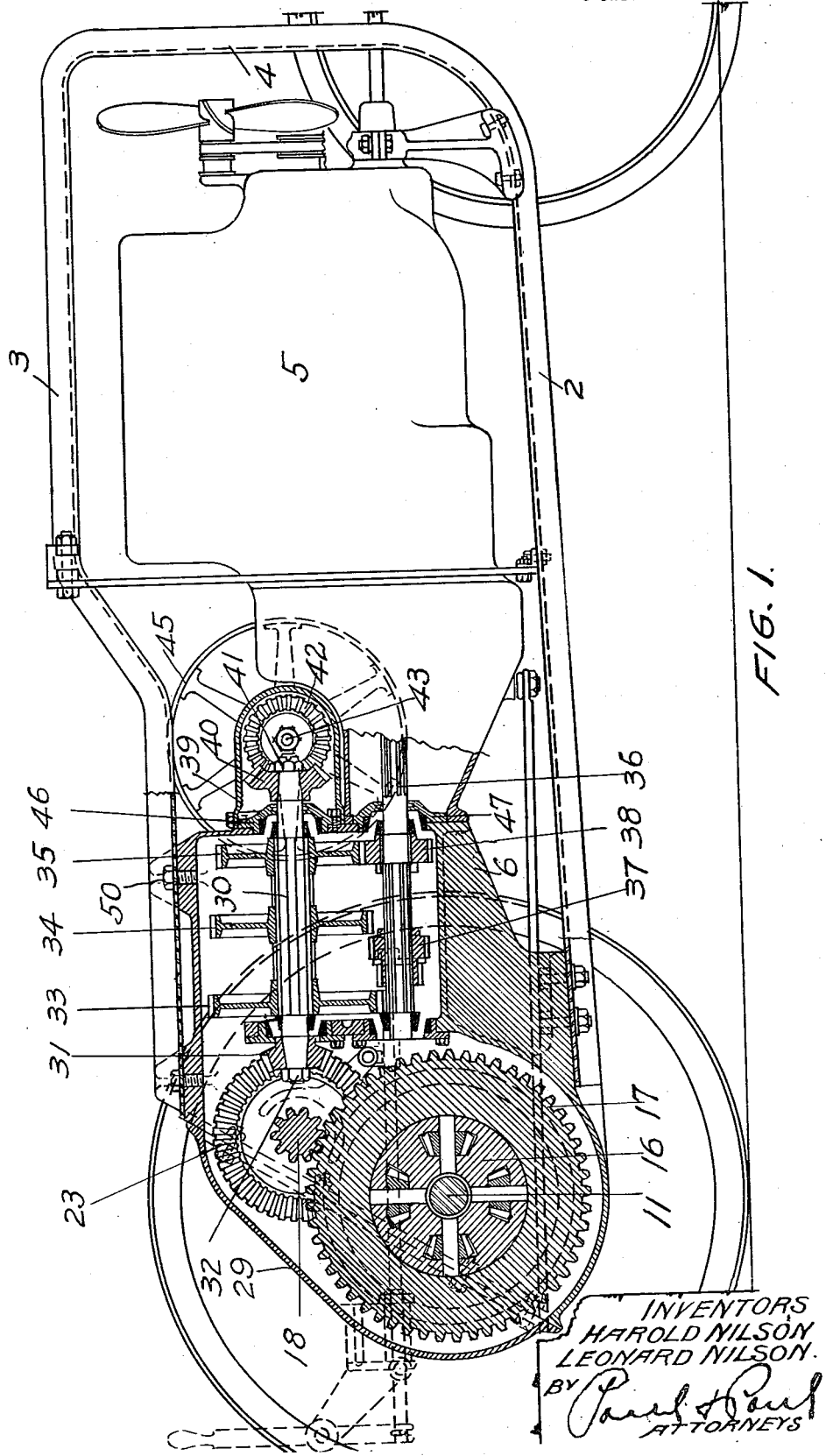

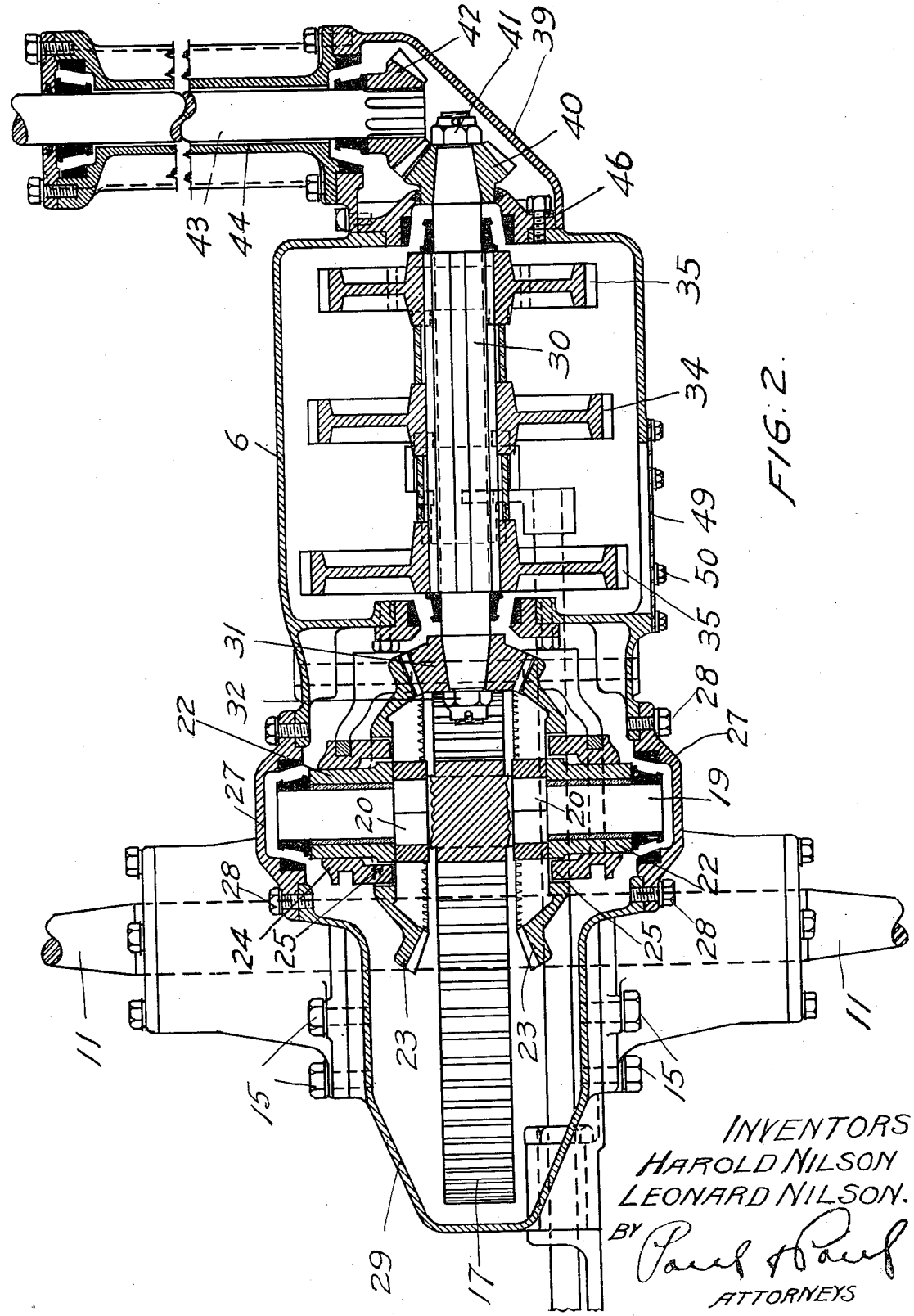

UNITED STATES PATENT OFFICE.

HAROLD NILSON AND LEONARD NILSON, OF WAYZATA, MINNESOTA.

TRANSMISSION CASING FOR TRACTION MACHINES.

1,415,606.   Specification of Letters Patent.   Patented May 9, 1922.

Application filed February 3, 1919. Serial No. 274,669.

*To all whom it may concern:*

Be it known that we, HAROLD NILSON and LEONARD NILSON, citizens of the United States, residents of Wayzata, county of Hennepin, State of Minnesota, have invented certain new and useful Improvements in Transmission Casings for Traction Machines, of which the following is a specification.

The object of our invention is to provide a transmission casing of such construction that when it is mounted in a traction machine the gearing and the shafts therefore can all be readily removed from the machine without disturbing the connections of the casing with its supporting frame, and it will therefore be possible for the operator of the machine to obtain convenient access to the transmission gears, bearings, or shafts therefor when the machine is in the field.

Other objects of the invention will appear from the following detailed description.

The invention consists generally in various constructions and combinations, all as hereinafter described and particularly pointed out in the claims.

In the accompanying drawings forming part of this specification,

Figure 1 is a side elevation, partially in section, of a traction machine and transmission casing embodying our invention, Figure 2 is a horizontal sectional view through the transmission casing, Figure 3 is a transverse sectional view through the rear portion of the transmission casing, showing the manner of mounting the gear shaft and rear axle therein, Figure 4 is a side view of the rear portion of the transmission casing, with the gearing removed.

In the drawing, 2 and 3 represent the lower and upper rails of the tractor frame having a forward connecting end bar 4. This bar and the rails 2 and 3 are preferably composed of channel bar bent to the form shown, with the rail 3 arranged above the rail 2 in a vertical plane to provide a narrow, relatively deep support for the operating parts of the machine. 5 is a source of motive power carried between the rails 2 and 3. 6 is a housing or casing interposed between the rear portions of the rails 2 and 3 and securely bolted thereto. The side walls of this casing have openings 7 and 8 therein with throats 9 and 10 extending through the rear edges of said side walls, as shown in Figure 4. 11 is the rear axle of the machine having anti-friction bearings 12 in hubs 13 which are provided with annular flanges 14 secured to the edges of the opening 7 by suitable means, such as bolts 15. When these hubs are in place and the bolts 15 secured, the opening 7 will be wholly covered, but when the bolts are removed, the hubs 13 may be pulled off the ends of the axle 11 and then the axle may be withdrawn from the casing through the openings 9.

A differential 16 is mounted on the middle portion of the axle 11, which as shown in Figure 3, is divided into independent axle sections and 17 is a large gear wheel connected through said differential with said axle sections. This gear wheel meshes with a pinion 18 that is formed on the shaft 19 and at each end of said pinion said shaft is provided with rectangular sections 20 on which clutch spiders 21 are mounted and held against revolution. The outer ends of the shaft 19 have hubs 22 of beveled gears 23 thereon and rings 24 are loosely mounted on said hubs and have clutch arms 25 fitting within slots 26 in the gears 23. These gears 23 are normally loose on the shaft 19 but when the rings 24 are pressed inwardly the arms 25 will be projected through the openings 26 into engagement with the gears 21 for the purpose of locking the gears 23 and the spiders 21 together. The shaft 19 has bearings in plates 27 secured over the openings 10 by bolts 28 and when these bolts are removed, the shaft 19 may be withdrawn from the transmission casing through the opening 10 in the wall thereof and thereupon access may be easily and conveniently had to any of the gears or to the mechanism within the casing in the rear of these gears. Means are provided for moving the rings 24 back and forth on the hubs 22 to lock the gears 23 to the pinion 18 or release them.

A cover 29 is provided at the rear of the transmission casing for closing the opening leading to the gearing and also for covering the throats 9 and 10. As soon as this cover is removed, access may be had to the transmission gearing for examination or repairs.

In the forward portion of the transmission casing a shaft 30 is mounted having a pinion 31 at its rear end to mesh with the gears 23 and provided with a lock nut 32 which, when removed, will allow the convenient separation of the pinion from the shaft. Upon this shaft speed changing gears 33, 34 and 35 are mounted. 36 is the engine drive shaft and 37 represents pinions slidable on said drive shaft for engaging either of the gears 33 or 34. The gear 35 is engaged by a pinion 38. A housing 39 is provided for the forward end of the shaft 30 and a pinion 40 is held on the shaft by a lock nut 41. This pinion meshes with a similar pinion 42 on a shaft 43 which is journaled in a sleeve 44 and extends at right angles substantially to the shaft 30 and is provided with a pulley 45 from which power may be delivered from the machine for various purposes.

Upon removing the housing 39, access may be had to the pinion 40 and the nuts 41 so that the shaft 30 may be withdrawn from the machine. We prefer to provide plates 46 and 47 wherein the shafts 30 and 36 are mounted. This construction allows the shaft 30 to be drawn either forward or backward in the transmission casing when the nuts mounted on this shaft are removed.

The side wall of the transmission casing has a cover 49 secured by bolts 50 which, when removed, allows convenient access for insertion or removal of the change speed gears. The shaft 30 may be inserted at either end, but generally its rear end is inserted into the casing and the transmission gears dropped down in order and assembled on the shaft as it is pushed into its seat.

When the cover 29 is secured in place over the opening in the transmission casing, the gearing will all be concealed and protected but whenever access is desired thereto or removal of any of the gearing from the casing becomes necessary, the rear axle may be released by removing the bolts 15 and pulling the hubs 13 for the axle to allow its withdrawal through the throat 9, and by loosening the plates 27, the shaft 19 can be easily and quickly separated from the casing and from the shaft whereon the change speed gearing is mounted. Access may then be had to this shaft for removal or examination, all without the necessity of disturbing the connections of the transmission casing with the frame of the machine. No fitting or adjustment is necessary when the parts are reassembled, as each gear will find its proper position as soon as the bolts securing the hubs and plates in position are engaged with their sockets in the walls of the casing.

We claim as our invention:

1. In a traction machine, a frame, a transmission casing mounted in the rear portion of said frame and having an opening in its rear wall and a cover therefor, a rear axle journaled in the side walls of said casing and bridging said opening and having traction wheels on each side of said casing, a differential gearing mechanism mounted on said axle within said transmission casing, said axle and differential gearing mechanism being removable bodily from said casing through said opening when said cover is removed.

2. In a traction machine, a frame, a transmission casing mounted in the rear portion of said frame and having an opening in its rear wall and a cover therefor, a rear axle journaled in the side walls of said casing and bridging said opening and having traction wheels on each side of said casing, a differential gearing mechanism mounted on said axle within said transmission casing, said axle and differential gearing mechanism being removable bodily from said casing through said opening when said cover is removed, and a counter shaft and forward and reverse gearing mounted thereon arranged within said casing and in driving connection with said differential gearing and also removable from said casing through said opening therein.

3. In a traction machine, a frame, a transmission casing mounted in the rear portion of said frame and having an opening in its rear wall and a cover therefor, a rear axle journaled in the side walls of said casing and bridging said opening and having traction wheels on each side of said casing, a differential gearing mechanism mounted on said axle within said transmission casing, said axle and differential gearing mechanism being removable bodily from said casing through said opening when said cover is removed, a countershaft and forward and reverse gearing mounted thereon arranged within said casing and in driving connection with said differential gearing and also removable bodily from said casing through said opening, and a change speed shaft and change speed gears thereon having driving connections with said forward and reverse gears and also removable through said opening.

4. The combination, with a traction machine frame comprising upper and lower rails, of a transmission casing interposed between the rear portions of said upper and lower rails and secured thereto and having an opening in its rear wall and a cover therefor, a rear axle journaled in the side walls of said casing and having traction wheels mounted thereon and a differential gearing within said casing, a counter shaft having forward and reverse gears thereon also journaled in said casing, a change speed shaft and gears thereon mounted in said casing at right angles substantially to said axle and said counter shaft, a source of motive power mounted in said frame in front of said casing and having a driving shaft and change speed pinions thereon for engaging said change speed gears, said axle and differential gearing, said counter shaft and gears thereon in assembled relation and said change speed shaft being all removable through said opening in the wall of said casing when said cover is removed.

5. The combination, with a frame and a transmission casing mounted therein provided with an opening and slots in the opposite side walls of said opening, of a rear axle fitting within said slots and composed of sections having a differential gearing between them, hubs mounted on the ends of said axle sections and fitting over said slots and secured to the walls of said casing, said hubs having bearings for said axle sections and when removed allowing said sections to be withdrawn from said slots, and a cover normally closing said slots.

6. The combination, with a frame and a transmission casing mounted therein provided with an opening in its wall and a cover therefor, and slots arranged in pairs in the opposite side walls of said opening, a rear axle fitting within one pair of slots and composed of sections and a differential gearing thereon, said axle projecting at each end outside said casing, hubs having bearings for said axle removably mounted on the ends thereof and secured to the walls of said casing for holding said axle sections in said slots, a counter-shaft fitting within said second pair of slots and plates secured to said casing at the ends of said counter shaft and when removed allowing the withdrawal of said counter shaft from said slots and a pinion mounted on said counter shaft and meshing with said differential gearing.

7. The combination, with a transmission casing having an opening in its wall and a removable cover therefor, of a speed-changing gear shaft horizontally mounted in said casing, speed-changing gears on said shaft, the rear end of said shaft having a pinion and nut thereon, a counter shaft mounted transversely of said speed-changing shaft and having driving gears meshing with said pinion, said speed-changing shaft having a bearing in the forward portion of said casing, said countershaft being removable with its gears through the opening in said casing, and the removal of the nut and pinion on said speed-changing shaft allowing it to be withdrawn with its bearing from its gears through the front of said casing.

8. In a traction machine, a frame, a transmission casing having an opening in its wall and cover therefor, an axle journaled in the side walls of said casing and bridging said opening and having traction wheels, a differential gearing mechanism mounted on said axle within said casing, said axle and differential gearing being removable bodily from said casing.

9. In a traction machine, a frame, a transmission casing mounted thereon having an opening in its wall and cover, an axle journaled in the walls of said casing bridging said opening and having traction wheels, differential gear mechanism mounted on said axle within said transmission casing, a counter-shaft and forward and reverse gearings thereon arranged in said casing in driving connection with said differential gearing, said counter-shaft and gear thereon being removable bodily from said casing when said cover is removed.

10. In a traction machine, a frame a transmission casing mounted thereon, a rear axle journaled in the side walls of said casing and having traction wheels, differential gearing mechanism on said axle within said casing, said axle and differential gearing being removable bodily from said casing without separation.

In witness whereof, we have hereunto set our hands this 27th day of January, 1919.

HAROLD NILSON.
LEONARD NILSON.